United States Patent
Xu et al.

(10) Patent No.: US 10,547,705 B2
(45) Date of Patent: Jan. 28, 2020

(54) CACHING PROXY METHOD AND APPARATUS

(71) Applicant: Samsung Electronics Co., Ltd., Gyeonggi-do (KR)

(72) Inventors: Jiangwei Xu, Gyeonggi-do (KR); Sang Jun Moon, Seoul (KR); Young Seok Park, Seoul (KR); Chul Ki Lee, Seoul (KR); Jung Hwan Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 14/415,522

(22) PCT Filed: Jul. 3, 2013

(86) PCT No.: PCT/KR2013/005899
§ 371 (c)(1),
(2) Date: Jan. 16, 2015

(87) PCT Pub. No.: WO2014/014216
PCT Pub. Date: Jan. 23, 2014

(65) Prior Publication Data
US 2015/0222725 A1    Aug. 6, 2015

(30) Foreign Application Priority Data
Jul. 17, 2012  (KR) .................. 10-2012-0077988

(51) Int. Cl.
*G06F 15/16* (2006.01)
*H04L 29/08* (2006.01)
*H04L 29/06* (2006.01)

(52) U.S. Cl.
CPC .......... *H04L 67/2852* (2013.01); *H04L 67/06* (2013.01); *H04L 67/1097* (2013.01); *H04L 67/2842* (2013.01); *H04L 69/22* (2013.01)

(58) Field of Classification Search
CPC ..... H04L 67/06; H04L 67/2852; H04L 69/22; H04L 67/2842; H04L 67/1097
(Continued)

(56) References Cited

U.S. PATENT DOCUMENTS 6,742,084 B1 * 5/2004 Defouw ................ G06F 12/122
                                                  711/133
7,849,163 B1 * 12/2010 Issa ........................ H04L 67/06
                                                  709/205

(Continued)

FOREIGN PATENT DOCUMENTS

| KR | 10-0734629 | 6/2007 |
| KR | 10-2009-0103552 | 10/2009 |
| KR | 10-0959759 | 5/2010 |

OTHER PUBLICATIONS

International Search Report dated Oct. 21, 2013 in connection with International Patent Application No. PCT/KR2013/005899, 5 pages.

(Continued)

*Primary Examiner* — Oscar A Louie
*Assistant Examiner* — Oluwatosin M Gidado (57) ABSTRACT

The present invention relates to a proxy apparatus and to a caching method of same. The caching method of the proxy apparatus according to one embodiment of the present invention includes the steps of: receiving a transmission request for content that can be divided into a plurality of blocks and instruction information for the playback position of the content from an external device; obtaining a header block that includes the header of the content when receiving the transmission request; identifying an intermediate block that corresponds to the playback position using the header;

(Continued)

requesting and obtaining the intermediate block through a network when the identified intermediate block is not cached in the proxy apparatus; and transmitting to the external device at least a portion of the header and at least a portion of the intermediate block corresponding to the request. According to one embodiment of the present invention, even in a case where the size of a piece of content is great but only a specific portion is used, an efficient caching method and apparatus can be provided.

22 Claims, 7 Drawing Sheets

(58) Field of Classification Search
USPC .......................................... 703/213; 709/213
See application file for complete search history.

(56) References Cited

U.S. PATENT DOCUMENTS

| | | | | |
|---|---|---|---|---|
| 8,117,285 | B1* | 2/2012 | Katzer | H04L 67/02 709/219 |
| 9,038,116 | B1* | 5/2015 | Knox | H04L 12/2805 709/219 |
| 2004/0003101 | A1 | 1/2004 | Roth et al. | |
| 2005/0097085 | A1 | 5/2005 | Shen et al. | |
| 2008/0273546 | A1* | 11/2008 | Johnson | H04L 49/251 370/419 |
| 2009/0157974 | A1* | 6/2009 | Lasser | G06F 12/0884 711/135 |
| 2009/0300231 | A1* | 12/2009 | Munetsugu | H04N 7/17318 710/33 |
| 2009/0304363 | A1* | 12/2009 | Kim | G11B 27/105 386/241 |
| 2011/0069705 | A1* | 3/2011 | Glasser | H04L 12/1836 370/390 |
| 2012/0246332 | A1* | 9/2012 | Lee | H04L 65/4076 709/231 |
| 2012/0311017 | A1* | 12/2012 | Sze | H04L 67/2814 709/202 |

OTHER PUBLICATIONS

Written Opinion of International Searching Authority dated Oct. 21, 2013 in connection with International Patent Application No. PCT/KR2013/005899, 4 pages.

* cited by examiner

CACHING PROXY METHOD AND APPARATUS

CROSS-REFERENCE TO RELATED APPLICATION(S)

The present application claims priority under 35 U.S.C. § 365 to International Patent Application No. PCT/KR2013/005899 filed Jul. 3, 2013, entitled "CACHING PROXY METHOD AND APPARATUS". International Patent Application No. PCT/KR2013/005899 claims priority under 35 U.S.C. § 365 and/or 35 U.S.C. § 119(a) to Korean Patent Application No. 10-2012-0077988 filed Jul. 17, 2012, which are incorporated herein by reference into the present disclosure as if fully set forth herein.

TECHNICAL FIELD

The present invention relates to a caching method and apparatus and, in particular, to a caching method and apparatus of a proxy device.

BACKGROUND ART

Caching Proxy is a caching technique implemented in a proxy device, e.g., a proxy server. The caching proxy is used widely in Internet for improving Hyper-Text Transfer Protocol (HTTP) response time. All the HTTP requests from clients are transferred to a caching proxy device. If an HTTP request hits the cache of the caching proxy, the caching proxy device provides the cached content as a response to the HTTP request. Otherwise, if the HTTP request does not hit the cache, i.e. misses the cache, the caching proxy device send the HTTP request to a web server or a parent proxy server and receives an HTTP response therefrom. The caching proxy device caches the HTTP response and sends the HTTP response to the client.

If the content corresponding to the HTTP request exists among the contents cached by the caching proxy, this is expressed by "it hits the cache." Otherwise if the content corresponding to the HTTP request does not exist among the contents cached by the caching proxy, this is expressed by "it misses the cache."

If a content which is large in size but only a specific part of which is used frequently, it is inappropriate and inefficient to cache the whole content. For example, there may be a motion picture content of which only the starting part is played more frequently than the rest part. Also, if a 10-minute motion picture has an important scene in the duration of 5:30~6:00, the corresponding part is likely to be accessed frequently. There is therefore a need of a method for solving the above problem.

DISCLOSURE OF INVENTION

Technical Problem

The present invention has been proposed to solve the above problem and aims to provide a caching method and apparatus that is capable of caching the content efficiently even when the content is large in size and has a part accessed frequently.

Solution to Problem

In accordance with an aspect of the present invention, a caching method of a proxy device includes receiving a transmission request for a content capable of being split into a plurality of blocks and an indication information on a playback position of the content from an external device, acquiring a header block including a header of the content upon receipt of the transmission request, identifying an intermediate block corresponding to the playback position based on the header, and requesting, when the intermediate block is not cached in the proxy device, a network of the intermediate block, and transmitting at least part of the header and at least part of the intermediate block to the external device in correspondence to the request.

In accordance with another aspect of the present invention, a proxy device includes a communication unit which receives a transmission request for a content capable of being split into a plurality of blocks and an indication information on a playback position of the content from an external device, a control unit which acquires a header block including a header of the content upon receipt of the transmission request, identifies an intermediate block corresponding to the playback position based on the header, and requests, when the intermediate block is not cached in the proxy device, a network of the intermediate block, and a storage unit which caches the content in unit of block, wherein the communication unit transmits at least part of the header and at least part of the intermediate block to the external device in correspondence to the request.

Advantageous Effects of Invention

The caching method and apparatus of the present invention is advantageous in terms of caching a content efficiently, especially the content which is large in size but a specific part of which is used frequently.

MODE FOR THE INVENTION

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

A proxy device and caching method thereof according to embodiments of the present invention are described hereinafter with reference to accompanying drawings.

Figure 1:
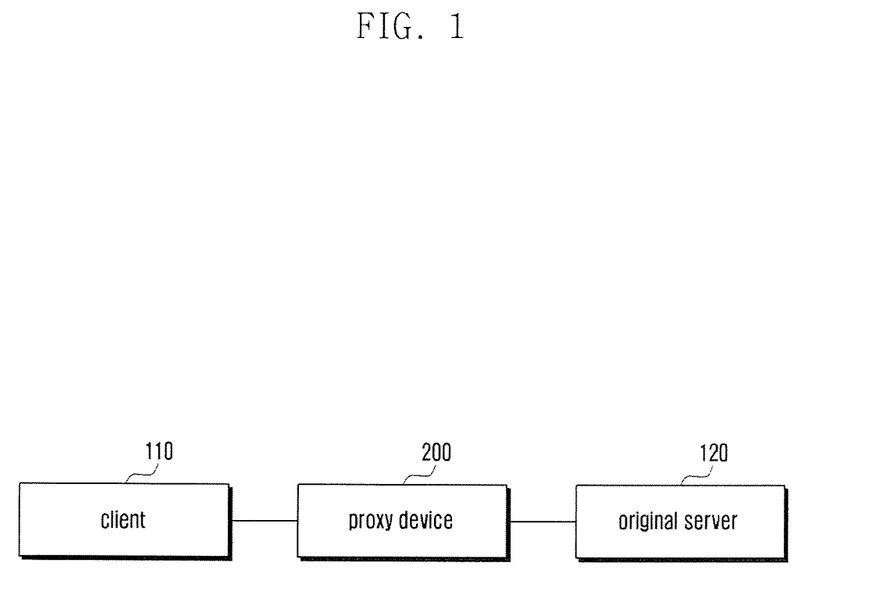
FIG. 1 is a schematic diagram illustrating a network system according to an embodiment of the present invention.

FIG. 1 is a schematic diagram illustrating a network system according to an embodiment of the present invention.

According to an embodiment of the present invention, the network system includes a client 110, a proxy device 200, and an original server 120.

The client 110 and the proxy device 200 are connected through a network. The proxy device 200 and the original server 120 are also connected through a network. The client 110 sends an HTTP request or other type of content request (content transmission request) to the proxy device 200 rather than the original server 120 directly. The client 110 may send all the HTTP requests to the proxy device 200. According to an alternative embodiment, the client 110 may send the proxy device 200 part of the HTTP requests according to a predetermined condition.

Upon receipt of the content transmission request from the client 110, the proxy device 200 determines whether the corresponding content is stored, i.e., cached, in the local storage of the proxy device. If the corresponding content is cached in the proxy device 200, the proxy device 200 provides the client 110 with the corresponding content in response to the content transmission request. Otherwise if the corresponding content is not cached in the proxy device 200, the proxy device 200 forwards the content transmission request to the original server 120. If the corresponding content is received from the original server 120, the proxy device 200 caches the content in the local storage and sends the content to the client 110. According to an embodiment of the present invention, if the content is equal to or greater than a predetermined size, e.g. if a video file is greater than 1 MB, the proxy device 200 splits the corresponding content into blocks and cache the blocks as individual objects. Detailed description thereof is made with reference to FIGS. 2 to 7.

Although the description is directed to the case where the proxy device 200 receives the content from the original server 120, the proxy server 200 may receive the content from a parent proxy device or another network entity configured to provide the content according to an alternative embodiment. Although the description is directed to the case where the proxy device 200 receives the content transmission request from the client 110, the proxy device 200 may receive the content transmission request from a child proxy device, another network entity, or an external device instead of the client 110 according to an alternative embodiment. In the following, the description is directed to the case where the proxy device 200 communicates with the client 110 and the original server 120.

Figure 2:
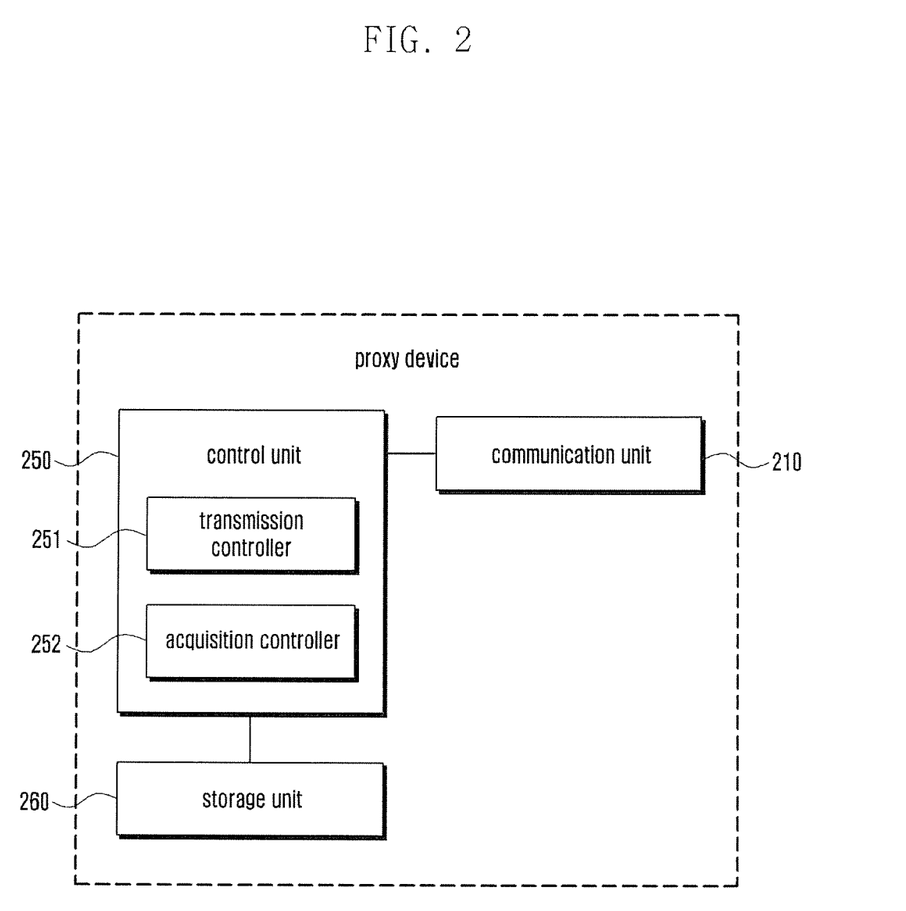
FIG. 2 is a block diagram illustrating a configuration of the proxy device according to an embodiment of the present invention.

FIG. 2 is a block diagram illustrating a configuration of the proxy device according to an embodiment of the present invention.

According to an embodiment of the present invention, the proxy device 200 includes a communication unit 210, a control unit 250, and a storage unit 260.

The communication unit 210 is responsible for communication with the client 110, the original server 120, and other network entities through at least one of wired and wireless communication links. The communication unit 210 transfers a content transmission request from the client 110 to the control unit 250. The communication unit 210 also may transmit the content transmission request received from the client 110 to the original server 120. The communication unit 210 may receive the content from the original server 120. The communication unit 210 also may forward the content received from the original server 120 to the client 110 under the control of the control unit 250.

The storage unit 260 stores an operating system for operation of the proxy device 200, and application programs and data. The storage unit 260 may store cache data under the control of the control unit 250 and provide the cache data in response to the request from the control unit 250. At this time, if the content is equal to or greater than a predetermined size, it may be split into blocks so as to be stored in unit of block. Detailed description of the caching method is made later with reference to FIGS. 3 to 7.

The control unit 250 controls overall operations of the proxy device 200. The control unit 250 controls the communication unit 210 to transmit/receive the content transmission request, contents, and other signals and data. The control unit 250 controls the storage unit 250 to store cache data in unit of block. According to an embodiment of the present invention, the control unit 250 includes a transmission controller 251 and an acquisition controller 252. Detailed descriptions of the transmission controller 251 and the acquisition controller 252 are made with reference to FIG. 3.

Figure 3:
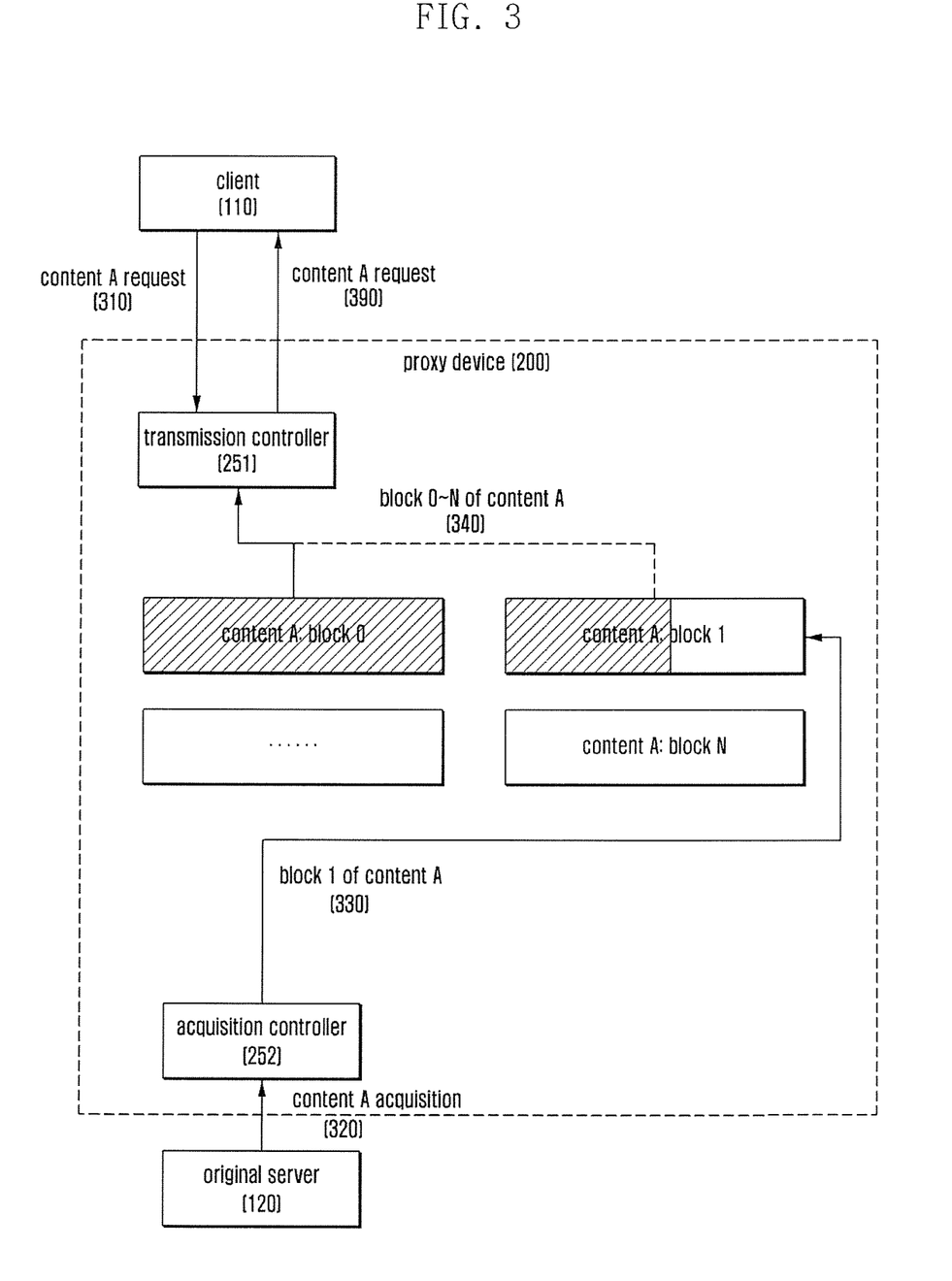
FIG. 3 is a diagram illustrating the caching operation of the proxy device according to an embodiment of the present invention.

FIG. 3 is a diagram illustrating the caching operation of the proxy device according to an embodiment of the present invention.

The client 110 sends the proxy device 200 a content transmission request for content A at step 310. The content request may include at least one of a Uniform Resource Locator (URL) and other identifier of the content A. The identifier of the content A may be transmitted to the proxy device 200 separately of the content transmission request or along with the content transmission request. According to an alternative embodiment, a playback position indicator of the content may be transmitted from the client 110 to the proxy device separately of or along with the content transmission request. For example, the user may set a playback position of the motion picture A to 5 minutes 0 second during or before the playback of the motion picture A. In this case, the playback position indicator indicating 5:00 is transmitted from the client 110 to the proxy device 200 along with or separately of the content transmission request for content A.

In the embodiment of the present invention, the content A is split into N blocks. The blocks 0 to block N−1 are identical in size (M) and the block N is smaller in size than other blocks. According to an alternative embodiment, the blocks may be different from one another in size. If the size of the content is smaller than M, the block-based caching proposed in the present invention is not used. According to an alternative embodiment, if the size of the content is smaller than M, the block size may be decreased for use of the block-based caching.

The transmission controller may receive the transmission request for the content A through the communication unit 210. The transmission controller 251 determines whether the header block (block 0) containing the header of the content is cached. If the block 0 is cached, the transmission controller 251 transmits the block 0 to the client 110. If the block 0 is not cached, the transmission controller 251 requests the acquisition controller 252 to acquire the header of the content A from the original server 120. After transmitting the block 0, the transmission controller 251 transmits block 1, block 2, and the like to the client 110 subsequently. The transmission is continued until the last block is transmitted or the session ends for other reasons. If a block to be transmitted is not cached, the transmission controller 251 requests the acquisition control 252 to acquire a part of the content which corresponds to the block from the original server 120. However, if the original server 120 does not provide specific part of the corresponding content, the acquisition controller 252 may try to acquire the whole content from the beginning part thereof from the original server 120.

If the client 110 request for a specific part, the transmission controller 251 determines whether the next block has been cached and, if not, then requests the acquisition control 252 to start acquiring the subsequent blocks in advance.

If the playback position indicator is transmitted to the proxy device 200 along with or separately of the content transmission request, the control unit 250 analyzes the header contained in the block 0 to identify the block (intermediate block) indicated by the playback position indicator. The transmission controller 251 determines whether the identified block is cached. If the identified block is cached, the transmission controller 251 transmits at least part of the cached block to the client 110. If the client 110 needs only the end part of the corresponding intermediate block, the transmission controller 251 may transmit the end part of the corresponding block to the client 110. If the identified block is not cached, the transmission controller 251 may request the acquisition controller 252 to acquire the part of the content which corresponds to the identified block. After transmitting the identified block, the transmission controller 251 may transmit the subsequent blocks. Even in this case, the transmission controller 251 checks the cache and transmits the cached blocks to the client 110 and requests the acquisition controller 252 to acquire the missing blocks and transmits the acquired blocks to the client 110. The transmission is continued until the last block is transmitted or the session ends for other reasons.

The transmission controller 251 may transmit part of the corresponding block which has been already acquired even before the whole block is not acquired yet.

Although the transmission controller 251 handles the data cached in unit of block, it is also possible to transmit a part or whole of the content A to the client 110 seamlessly without extra information. That is, it is possible to transmit the data blocks as if they are combined into one content. If there is any extra information which does not belongs to the content A in each data block, the corresponding information may not be transmitted to the client 110.

The acquisition controller 252 acquires the content A in response to the request from the transmission controller 251 at step 320. If the original server 120 supports partial transmission for specific part (specific playback position) of the content A, the acquisition controller 252 requests the original server 120 for the intended part of the content A. If the original server 120 does not support partial transmission for specific part (specific playback position) of the content A but the whole transmission, the acquisition controller 252 request the original server 120 for the content A for receiving from its beginning part.

The acquisition controller 252 stores the acquired content A as split at step 330. For example, the acquisition controller 252 splits the acquired content A into blocks of M bytes. In this case, the last block may be smaller than M bytes. According to an alternative embodiment, the acquisition controller 252 may store the content A as split into different size blocks. Whenever the accumulated data size becomes M bytes, the acquisition controller 252 stores the acquired data as a new block. Each block is stored along with the identifier of the content A and block number. The proxy device 200 may access to one of the blocks constituting the content through a predetermined method. The proxy device 200 may create a database for storing the identifier of the content A and the block number as a key to identify the storage address and store the blocks of content A discretely. For example, the content identifier and block number (block identifier) may be stored in the cache key map data structure. Other hash/list/array structure may be used. Also, the identifier of the content A may be associated with specific address (ADDR) of the storage unit 260 such that the blocks of the content A are stored consecutively in the space as large as the content A from the corresponding address (ADDR). In this case, the location of each block becomes $ADDR_+(block\ number) \times (block\ size=M)$. In the case that the blocks of the content A are stored consecutively in series, the storage space utilization efficiency is likely be degraded when part of the blocks forming the content are deleted. Accordingly, it is preferred for the acquisition controller 252 to store the blocks non-successively or, if successively, the intermediate blocks to be used for other purposes.

The transmission controller 251 acquires the data block corresponding to the request of the client 110 from the cache at step 340. The transmission controller 251 transmits the acquired data block to the client 110 at step 390. As described above, if the corresponding block is stored in the cache already, the transmission controller 251 obtains the block from the cache immediately. If the corresponding block is not store in the cache, the acquisition controller 252 acquires and caches the corresponding block such that the transmission controller 251 transmit the cached block to the client 110.

Figure 4:
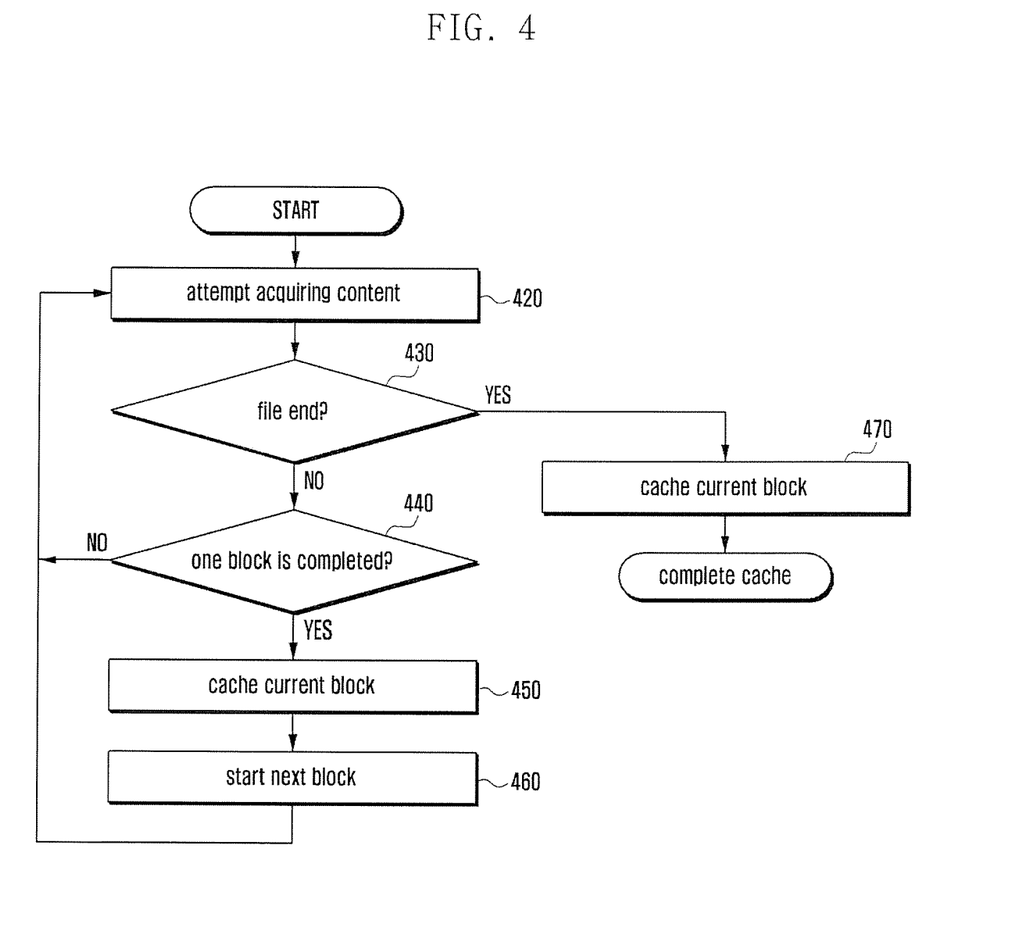
FIG. 4 is a flowchart illustrating a caching procedure of the proxy device according to an embodiment of the present invention.

FIG. 4 is a flowchart illustrating a caching procedure of the proxy device according to an embodiment of the present invention.

The proxy device 200 attempts acquiring the content A at step 420. If there is no indication about the playback position, the proxy device 200 attempts receiving the content A at its beginning. If there is any indication about the playback position, the proxy device 200 attempts receiving the content A at the playback position or at the block corresponding to the playback position. The received part is stored in the buffer. The proxy device 200 determines whether the content file is received completely. If the content file is received completely, the proxy device 200 caches the current block at step 470 and ends the procedure. If the content file is not received completely yet, the procedure goes to step 440.

At step 440, the proxy device determines whether one block is formed completely at step 440. If the size of dater in the buffer is greater than a predetermined block size M, it may be determined that one block is formed. If one block is formed, the procedure goes to step 450. The proxy device caches the current block (formed block) at step 450 and starts caching the next block at step 460. The data buffered in the buffer is cached as much as M bytes and the rest data is remained in the buffer. If the current block is not formed completely, the procedure goes to step 420 to continue acquiring the content data. In this way the content is cached in unit of block.

In the procedure of FIG. 4, although the current block is not formed completely, the partially completed block may be transmitted to the client 1110. Since it may take a little more time to form a whole block, it is possible to provide the user with a part of the content in advance in order for the user to start watching the content earlier.

Figure 5:
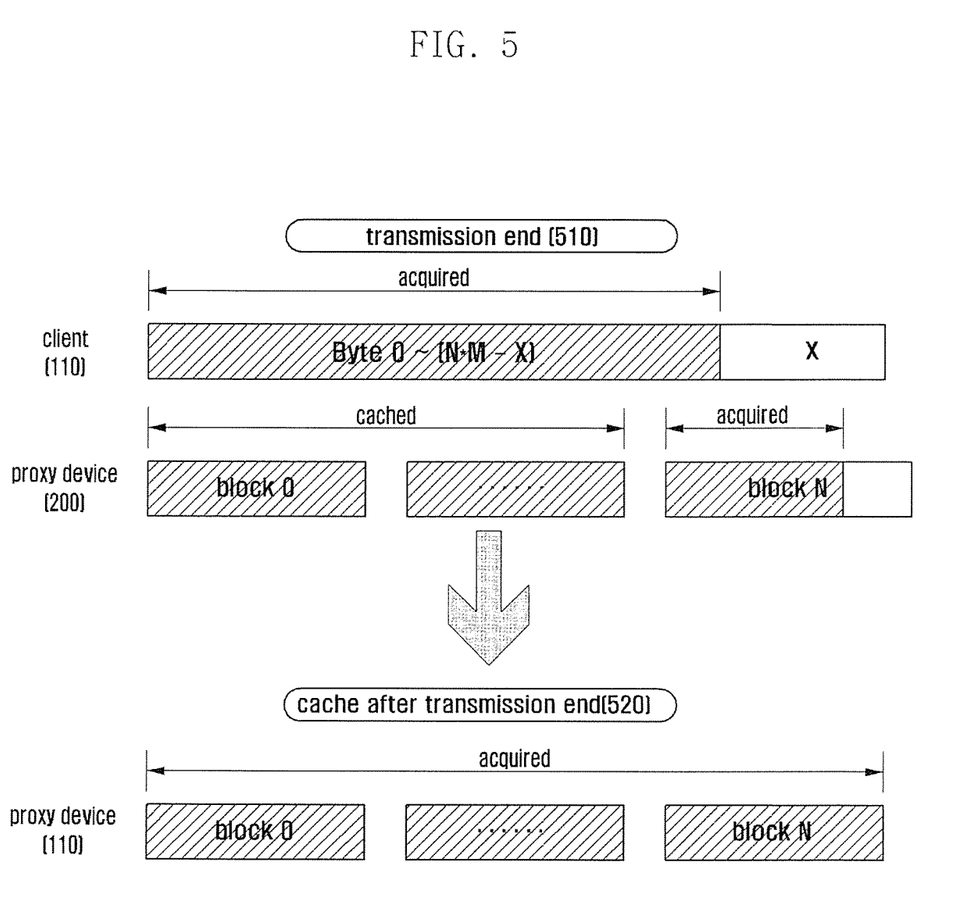
FIG. 5 is a diagram illustrating a situation where the connection between the client and the proxy device is terminated in the middle of transmission.

FIG. 5 is a diagram illustrating a situation where the connection between the client and the proxy device is terminated in the middle of transmission. The connection between the client 110 and the proxy device 200 is broken at step 510. For example, the client 110 may request the proxy device 200 to stop transmission. The connection between the client 110 and the proxy device 200 may be broken because of change in the network environment and other reasons. At the time when the connection is broken at step 510, the client 110 has received the data from 0 byte to N×M-X byte of the content, and the proxy device 300 has acquired blocks 0 to N−1 and part of block N. It is assumed that the content is made up of the blocks more than N. In this case, the proxy device 200 does not discard the block N but attempt content acquisition until the block N is received completely. If the block N is acquired wholly, the proxy device 200 caches the block N and, if there is a request afterward, provides the client 110 with the block N. However, the block N+1 and its subsequent blocks are not acquired any more.

Figure 6:
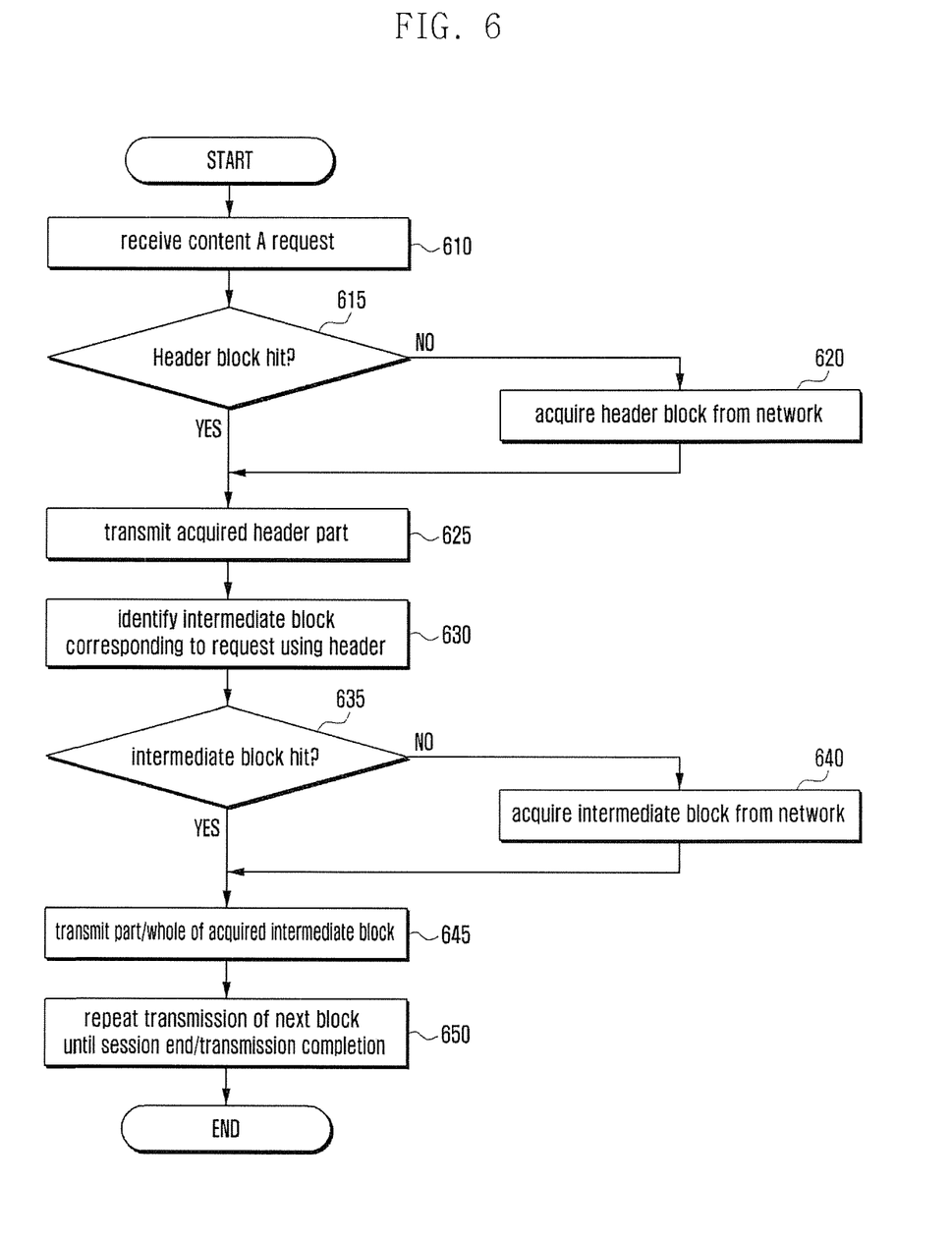
FIG. 6 is a flowchart illustrating a caching procedure of the proxy device 200 according to an embodiment of the present invention.

FIG. 6 is a flowchart illustrating a caching procedure of the proxy device 200 according to an embodiment of the present invention.

The proxy device 200 receives a content transmission request for content A at step 610. Here, the proxy device 200 assumes the content transmission request includes a playback position indicator.

The proxy device 200 determines whether the header block ($0^{th}$ block) of the content A is cached at step 615. If the header block of the content A is not cached, the proxy device 200 acquires the header block from the network, e.g. the original server 120, and caches the header block at step 620. Although it is assumed that the $0^{th}$ block is the header block herein, a block positioned at another position may be the header block depending on the embodiment. If the header block pf the content A is cached, step 620 is skipped.

The proxy device 200 sends the client 110 the header block at step 625. Before the header block is acquired completely, the proxy device 200 may send the client 110 acquired part of the head block. The proxy device 200 may send the client 110 the whole header block or part of the header block, e.g. metadata such as content type and length. The proxy device 200 may check the part necessary for use in rendering the content and transmit only the checked part to the client 110.

The proxy device 200 identifies the block indicated by the playback position indicator included in the request at step 630. Suppose that the playback position indicator indicates 4 minutes 0 second, block size is 4 MB, bit rate of the content is 1 MB per second, and the header size is 4 MB. One block contains data of 4 seconds, and there are 60 blocks for content of 4 minutes and 1 MB for the header. Accordingly, the $61^{st}$ block is the block corresponding to the playback position of 4 minutes 0 second. Depending on the type of the content, the index may be included in the header. In this case, it is possible to identify the block corresponding to the playback position by referencing the index. If no playback position is designated, step 630 is not necessary, and the proxy device 200 sends the client 110 the content from the block 0 in sequence.

The proxy device 200 determines whether the corresponding block is cached at step 635. If the corresponding block is not cached, the proxy device 200 requests the network, e.g. the original server 120, for the corresponding block and caches the corresponding block received from network at step 640. If the original server 120 does not support partial content request, the proxy device 200 receives the content from its beginning part or according to the transmission scheme of the original server to acquire and cache the corresponding part. If the corresponding block is cached, step 640 is skipped.

The proxy device 200 sends the client 110 at least part of the corresponding block at step 645. If the client does not want the whole of the corresponding block, the proxy device 200 may provide the client 110 with the part wanted by the client 110.

The proxy device 200 transmits the blocks subsequent to the corresponding block one by one repeatedly until the session ends or the corresponding content transmission is completed at step 650. At this time, the proxy device 200 may try to acquire the next block ($(N+1)^{th}$ block) before its transmission timing in the course of transmitting the $N^{th}$ block. Even in this case, the cached block may be provided to the client 110 without receipt attempt.

Figure 7:
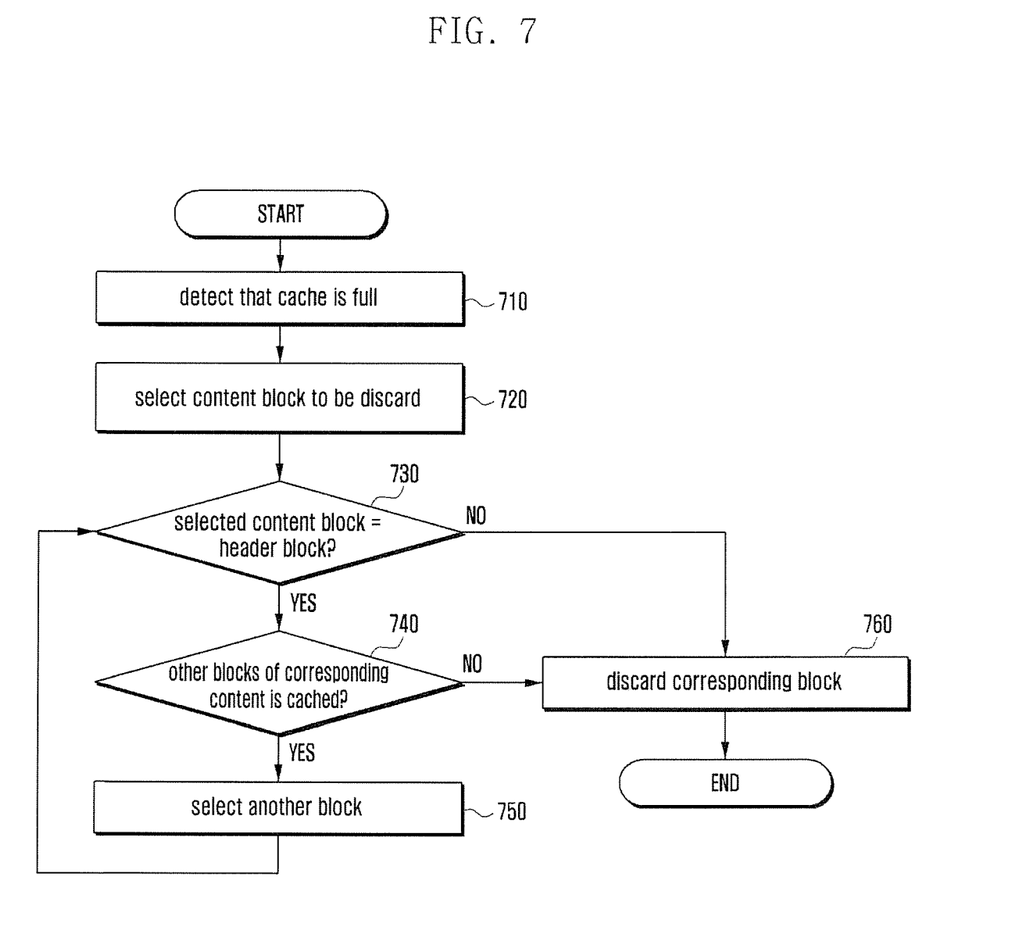
FIG. 7 is a flowchart illustrating a cache flush procedure according to an embodiment of the present invention.

FIG. 7 is a flowchart illustrating a cache flush procedure according to an embodiment of the present invention.

The proxy device 200 detects that the cache is full at step 710. According to an alternative embodiment, the proxy device 200 may detect the necessity of flushing the cache for different reasons.

The proxy device 200 selects the content block to be discarded at step 720. For example, the proxy device may retain the use history of each block. The proxy device 200 may select the oldest used block. According to an alternative embodiment, the proxy device 200 may select the block used most sparsely in the most recent duration of a predetermined length. Also, one of the cache flush policies now known or to be known in the future may be used. However, the cache flush policy may cause modification of steps 730 to 760.

The proxy device 730 determines whether the selected block is the header block of the content at step 730. The content A is made up of a plurality of blocks of which the $0^{th}$ block (header block) is selected as a target to be discarded, this is the case that the selected block is the header block. If the selected block is the header block, the procedure goes to step 740.

At step 740, the proxy device 200 determines whether another cached block exists in association with the corresponding content. For example, if the header block of the content A is selected, the proxy device 200 determines whether another block of the content A is cached. If another block of the content A is cached, the proxy device selects one of the cached blocks of the content A with the exception of the header block as a target to be discarded at step 750. If there is no cached block of the content A, the proxy device 200 discards the corresponding block at step 760. According to an alternative embodiment, the proxy device 200 may discard the most sparsely used block or the oldest used block among the other blocks of the corresponding content at step 750.

This procedure is performed because it is impossible to access a certain block without the header block of the content. That is, the header information is inevitable to play any part of the content and thus it is preferably to discard another block instead of the header block.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A caching method of a proxy device, the method comprising:
   receiving, from an external device, a transmission request comprising:
      a request for content configured to split into a plurality of blocks, and
      indication information about a playback position of the content;
   acquiring a header block including a header of the content in response to the transmission request;
   identifying information related to a type of the content and information related to a length of the content which is needed for rendering the content without receiving a whole header block based on the acquired header block;
   transmitting, to the external device, the information related to the type of the content and the information related to the length of the content for rendering the content by the external device before acquiring the whole header block;
   identifying an intermediate block corresponding to the playback position based on the header;
   when the intermediate block is not cached in the proxy device, initiating acquiring the intermediate block from a network;
   transmitting, to the external device, a part of the intermediate block before acquiring the whole intermediate block; and
   when the transmission of the acquired intermediate block from the proxy device to the external device is stopped while acquiring the intermediate block, caching the whole intermediate block for retransmission of the intermediate block to the proxy device.

2. The method of claim 1, further comprising:
   selecting, when cache flush necessity is detected, a block to be discarded;
   determining, when the selected block is the header block of the content, whether other blocks of the content are cached; and
   reselecting, when other blocks of the content are cached, the block to be discarded among the blocks with exception of the header block.

3. The method of claim 1, further comprising requesting, when the intermediate block is not a last block of the content and when a next block of the intermediate block is not cached, the network for the next block.

4. The method of claim 1, further comprising:
   acquiring, when the header block is cached in the proxy device, the cached header block; and
   acquiring, when the intermediate block is cached in a memory of the proxy device, the intermediate block stored in the memory.

5. A proxy device comprising:
   a transceiver configured to:
   receive, from an external device a transmission request comprising:
      a request for content configured to split into a plurality of blocks, and
      indication information about a playback position of the content;
   a controller configured to:
      acquire a header block including a header of the content in response to the transmission request;
      identifying information related to a type of the content and information related to a length of the content which is needed for rendering the content without receiving a whole header block based on the acquired header block;

transmitting, to the external device, the information related to the type of the content and the information related to the length of the content for rendering the content by the external device before acquiring the whole header block;

identify an intermediate block corresponding to the playback position based on the header;

when the intermediate block is not cached in the proxy device, initiate acquiring the intermediate block from a network;

transmit, to the external device, a part of the intermediate block before acquiring the whole intermediate block; and when the transmission of the acquired intermediate block from the proxy device to the external device is stopped while acquiring the intermediate block, caching the whole intermediate block for retransmission of the intermediate block to the proxy device; and a memory configured to cache the content of the block.

6. The proxy device of claim 5, wherein the controller is configured to:

select, when cache flush necessity is detected, a block to be discarded, determine, when the selected block is the header block of the content, whether other blocks of the content are cached, and reselect, when other blocks of the content are cached, the block to be discarded among the blocks with exception of the header block.

7. The proxy device of claim 5, wherein the controller is configured to request, when the intermediate block is not a last block of the content and the next block of the intermediate block is not cached, the network for the next block.

8. The proxy device of claim 5, wherein the controller is configured to acquire when the header block is cached in the proxy device, the cached header block, and when the intermediate block is cached in the memory of the proxy device, the intermediate block stored in the memory.

9. The method of claim 1, wherein the transmission request comprises at least one of a uniform resource locator (URL) and another identifier of the content.

10. The method of claim 1, wherein each of the plurality of blocks comprise different sizes.

11. The method of claim 2, wherein the block to be discarded is selected based on a use history of each block.

12. The proxy device of claim 5, wherein the transmission request comprises at least one of a uniform resource locator (URL) and another identifier of the content.

13. The proxy device of claim 5, wherein each of the plurality of blocks comprise different sizes.

14. The proxy device of claim 6, wherein the controller is configured to selecting a block to be discarded based on a use history of each block.

15. The method of claim 1, wherein the playback position is associated with a time point in the content.

16. The method of claim 1, further comprising:

acquiring the content including the plurality of blocks in response to the transmission request; and storing the acquired content by splitting the acquired content according to storage units corresponding to the plurality of blocks, and wherein each of the storage units is determined based on an identifier of the content and a sequence number of each of the plurality of blocks stored in each of the storage units.

17. The method of claim 16, further comprising:

generating a database for acquiring a storage address of each of the storage units based on the identifier of the content and the sequence number of each of the plurality of blocks, and wherein each of the storage units is discontinuous.

18. The method of claim 16, further comprising:

storing, by mutual association, the identifier of the content and a specific address of a memory; and storing continuously the plurality of blocks in a continuous space ranging by a size of the content from the specific address.

19. The proxy device of claim 5, wherein the playback position is associated with a time point in the content.

20. The proxy device of claim 5, wherein the controller is further configured to acquire the content including the plurality of blocks in response to the transmission request, wherein the memory configured to store the acquired content by splitting the acquired content according to storage units corresponding to the plurality of blocks, and wherein each of the storage units is determined based on an identifier of the content and a sequence number of each of the plurality of blocks stored in each of the storage units.

21. The proxy device of claim 20, wherein the controller is further configured to generate a database for acquiring a storage address of each of the storage units based on the identifier of the content and the sequence number of each of the plurality of blocks, and wherein each of the storage units is discontinuous.

22. The proxy device of claim 20, wherein the memory configured to:

store, by mutual association, the identifier of the content and a specific address of the memory, and store continuously the plurality of blocks in a continuous space ranging by a size of the content from the specific address.

* * * * *